(12) United States Patent
Lim (10) Patent No.: US 12,084,033 B2
(45) Date of Patent: Sep. 10, 2024

(54) ELECTRONIC BRAKE SYSTEM AND CONTROL METHOD THEREFOR

(71) Applicant: HL MANDO CORPORATION, Gyeonggi-do (KR)

(72) Inventor: Seungkuk Lim, Seoul (KR)

(73) Assignee: HL MANDO CORPORATION, Gyeonggi-do (KR)

( * ) Notice: Subject to any disclaimer, the term of this patent is extended or adjusted under 35 U.S.C. 154(b) by 248 days.

(21) Appl. No.: 17/771,432

(22) PCT Filed: Oct. 22, 2020

(86) PCT No.: PCT/KR2020/095127
§ 371 (c)(1),
(2) Date: Apr. 22, 2022

(87) PCT Pub. No.: WO2021/080402
PCT Pub. Date: Apr. 29, 2021

(65) Prior Publication Data
US 2022/0363230 A1 Nov. 17, 2022

(30) Foreign Application Priority Data
Oct. 23, 2019 (KR) .................. 10-2019-0132475

(51) Int. Cl.
*B60T 8/40* (2006.01)
*B60T 7/04* (2006.01)
(Continued)

(52) U.S. Cl.
CPC ............ *B60T 8/4081* (2013.01); *B60T 7/042* (2013.01); *B60T 8/171* (2013.01); *B60T 8/172* (2013.01);
(Continued)

(58) Field of Classification Search
CPC ............................ B60T 8/4081; B60T 13/68
See application file for complete search history.

(56) References Cited

U.S. PATENT DOCUMENTS

2007/0159001 A1   7/2007   Miyazaki et al.
2011/0006593 A1*  1/2011   Sakai ................... B60T 8/4081
                                                    303/6.01
(Continued)

FOREIGN PATENT DOCUMENTS

CN      101070066      11/2007
CN      101636301      1/2010
(Continued)

OTHER PUBLICATIONS

Office Action dated Sep. 20, 2023 for Chinese Patent Application No. 202080073125.0 and its English translation from Global Dossier.
(Continued)

*Primary Examiner* — Long T Tran
(74) *Attorney, Agent, or Firm* — Womble Bond Dickinson (US) LLP (57) ABSTRACT

Provided is an electronic brake system including: a reservoir in which a pressurizing medium is stored; a master cylinder configured to discharge the pressurizing medium according to a pedal effort of a brake pedal; a hydraulic pressure supply device configured to operate a hydraulic piston according to an electrical signal output in response to a displacement of the brake pedal to generate a hydraulic pressure; a hydraulic control unit connected to the hydraulic pressure supply device and configured to control a flow of the hydraulic pressure transferred to a wheel cylinder; a pedal simulator connected to the master cylinder and configured to provide a reaction force for the brake pedal; a simulator valve configured to open and close a flow path connecting the master cylinder and the pedal simulator; a cut valve config-
(Continued)

ured to open and close a flow path connecting the master cylinder and the hydraulic control unit; a pedal displacement sensor configured to detect displacement information of the brake pedal; a pressure sensor configured to detect pressure information of the pedal simulator; and a controller configured to compensate for a target pressure according to the displacement of the brake pedal based on the displacement information of the brake pedal detected through the pedal displacement sensor and the pressure information of the pedal simulator detected through the pressure sensor when the cut valve is closed and the simulator valve is opened, and drive the hydraulic pressure supply device according to the compensated target pressure.

17 Claims, 6 Drawing Sheets

(51) Int. Cl.
  *B60T 8/171* (2006.01)
  *B60T 8/172* (2006.01)
  *B60T 13/66* (2006.01)
  *B60T 13/68* (2006.01)

(52) U.S. Cl.
  CPC .......... *B60T 13/662* (2013.01); *B60T 13/686* (2013.01); *B60T 2220/04* (2013.01); *B60T 2270/82* (2013.01); *B60T 2270/88* (2013.01)

(56) References Cited

U.S. PATENT DOCUMENTS

| | | | | |
|---|---|---|---|---|
| 2011/0285200 A1* | 11/2011 | Hatano | ................ | B60T 13/168 303/6.01 |
| 2012/0313427 A1 | 12/2012 | Nishioka et al. | | |
| 2014/0167494 A1 | 6/2014 | Jeon | | |
| 2017/0050629 A1* | 2/2017 | Kim | ................ | B60T 13/662 |
| 2017/0166176 A1* | 6/2017 | Yang | ................ | B60T 7/042 |
| 2019/0135256 A1* | 5/2019 | Lee | ................ | B60T 8/409 |
| 2019/0193701 A1* | 6/2019 | Kuhlman | ................ | B60T 13/166 |
| 2019/0275997 A1* | 9/2019 | Park | ................ | B60T 13/18 |
| 2019/0329748 A1* | 10/2019 | Kawakami | ................ | B60T 8/368 |
| 2019/0329751 A1* | 10/2019 | Jeong | ................ | B60T 11/20 |
| 2020/0079338 A1* | 3/2020 | Roh | ................ | B60T 13/146 |

FOREIGN PATENT DOCUMENTS

| | | |
|---|---|---|
| CN | 105313857 | 2/2016 |
| DE | 102 39 126 | 7/2003 |
| DE | 10 2017 207 182 | 10/2018 |
| JP | 2006-273218 | 10/2006 |
| JP | 2008-162535 | 7/2008 |
| JP | 2014-94625 | 5/2014 |
| KR | 10-1724969 | 4/2017 |
| KR | 10-2017-0065827 | 6/2017 |
| WO | 2012/105526 | 8/2012 |

OTHER PUBLICATIONS

International Search Report for PCT/KR2020/095127 mailed on Feb. 22, 2021 and its English Translation from WIPO (now published as WO 2021/080402).

Written Opinion of the International Searching Authority for PCT/KR2020/095127 mailed on Feb. 22, 2021 and its English Machine Translation by Google Translate (now published as WO 2021/080402).

* cited by examiner

ELECTRONIC BRAKE SYSTEM AND CONTROL METHOD THEREFOR

CROSS-REFERENCE TO RELATED APPLICATIONS

The present application is the national stage of International Patent Application No. PCT/KR2020/095127 filed on Oct. 22, 2020, which claims the priority to Korean Patent Application No. 10-2019-0132475 filed in the Korean Intellectual Property Office on Oct. 23, 2019, the entire contents of which are incorporated herein by reference.

TECHNICAL FIELD

The disclosure relates to an electronic brake system and a method of controlling the same, and more specifically, to an electronic brake system that generates a braking force according to an electrical signal corresponding to a displacement of a brake pedal, and a method of controlling the same.

BACKGROUND ART

In general, an electronic brake system may include a liquid pressure supply device that, when a driver appliers a brake pedal, receives a driver's braking intention from a pedal displacement sensor for detecting a displacement of a brake pedal as an electrical signal and a hydraulic control unit that controls a liquid pressure transferred to each wheel cylinder.

The electronic brake system provided with the liquid pressure supply device and the hydraulic control unit as described above is disclosed in European Patent Publication No. EP 2520473. According to the disclosure, the liquid pressure supply device drives a motor according to a pedal effort of a brake pedal to change the position of a piston using a rotational force of the motor to generate a liquid pressure required for braking and supply the liquid pressure to the hydraulic control unit.

In a normal operation mode of the electronic brake system, the operation of the brake pedal by the driver is not directly linked to the wheel cylinders, and in an abnormal operation mode of the electronic brake system, the operation of the brake pedal by the driver is directly linked to the wheel cylinders. To this end, a cut valve for opening and closing a flow path between a master cylinder and the hydraulic control unit is provided.

In addition, since the operation of the brake pedal by the driver in the normal operation mode of the electronic brake system is not directly linked to the wheel cylinders, the electronic brake system is provided with a pedal simulator for providing the driver with a pedal feel during operation of the brake pedal. The pedal simulator operates to, when a driver applies a pedal effort for operating the brake pedal, provide the driver with a reaction force against the pedal effort of the brake pedal with a hydraulic pressure generated from the master cylinder such that the driver may be provided with a familiar and stable pedal feel.

In addition, the electronic brake system is provided with a simulator valve for opening and closing a flow path between the master cylinder and the pedal simulator such that, when the driver applies a pedal effort for the operation of the brake pedal in a normal operation mode, the hydraulic pressure generated by the master cylinder is transferred to the pedal simulator.

Conventionally, in a normal operation mode, the cut valve is closed to block the flow path between the master cylinder and the hydraulic control unit, and the simulator valve is opened to transfer the hydraulic pressure generated by the master cylinder to the pedal simulator.

However, if the cut valve has a delay of closing due to the characteristics thereof, or the driver rapidly applies the brake pedal, an initial hydraulic pressure generated by the master cylinder is not transferred from the pedal simulator and but leaking to the side of the hydraulic control unit before the cut valve is closed, so that the pedal effort of the brake pedal may be momentarily lightened.

In the electronic brake system, the target pressure is determined according to a displacement of the brake pedal, and if the brake pedal effort is lightened, the amount of the brake pedal displacement is increased as much as the reduced brake pedal effort, so that the target pressure may be determined to be higher relative to a brake pedal effort intended by the driver. As a result, the vehicle may be controlled at a target pressure higher than that of a normal state and abruptly decelerate, which causes the driver to feel a deceleration abruptness.

DISCLOSURE

Technical Problem

Therefore, it is an object of the disclosure to provide an electronic brake system capable of realizing a uniform braking deceleration even when pedal effort characteristics of a brake pedal are changed and a method of controlling the same.

Technical Solution

According to an aspect of the disclosure, there is provided there is provided an electronic brake system including: a reservoir in which a pressurizing medium is stored; a master cylinder configured to discharge the pressurizing medium according to a pedal effort of a brake pedal; a hydraulic pressure supply device configured to operate a hydraulic piston according to an electrical signal output in response to a displacement of the brake pedal to generate a hydraulic pressure; a hydraulic control unit connected to the hydraulic pressure supply device and configured to control a flow of the hydraulic pressure transferred to a wheel cylinder; a pedal simulator connected to the master cylinder and configured to provide a reaction force for the brake pedal; a simulator valve configured to open and close a flow path connecting the master cylinder and the pedal simulator; a cut valve configured to open and close a flow path connecting the master cylinder and the hydraulic control unit; a pedal displacement sensor configured to detect displacement information of the brake pedal; a pressure sensor configured to detect pressure information of the pedal simulator; and a controller configured to compensate for a target pressure according to the displacement of the brake pedal based on the displacement information of the brake pedal detected through the pedal displacement sensor and the pressure information of the pedal simulator detected through the pressure sensor when the cut valve is closed and the simulator valve is opened, and drive the hydraulic pressure supply device according to the compensated target pressure.

The controller may be configured to, in response to a value of the detected displacement of the brake pedal being higher than a preset displacement value and a value of the detected pressure of the pedal simulator being lower than a preset pressure value, compensate for the target pressure.

The controller may compensate for the target pressure based on a value of the detected displacement of the brake pedal, a change rate of the detected displacement of the brake pedal, a value of the detected pressure of the pedal simulator, and a change rate of the detected pressure of the pedal simulator.

The controller may be configured to, in response to the value of the detected displacement of the brake pedal being higher than a preset displacement value, the change rate of the detected displacement of the brake pedal being higher than a preset displacement change rate, the value of the detected pressure of the pedal simulator being lower than a preset pressure value, and the change rate of the detected pressure of the pedal simulator being lower than a preset pressure change rate, compensate for the target pressure.

The controller may be configured to identify a state of the pedal effort of the brake pedal based on the detected displacement information of the brake pedal and the detected pressure information of the pedal simulator, and in response to the pedal effort being in a lowered state, compensate for the target pressure.

The controller may be configured to, in response to the pedal effort being in a lowered state, decrease the target pressure.

The electronic brake system of claim 6, wherein the controller is configured to, in response to a value of the detected displacement of the brake pedal being higher than a preset displacement value, a change rate of the detected displacement of the brake pedal being higher than a preset displacement change rate, a value of the detected pressure of the pedal simulator being lower than a preset pressure value, and a change rate of the detected pressure of the pedal simulator being lower than a preset pressure change rate, identify that the pedal effort of the brake pedal is in a lowered state.

The controller may be configured to, in response to the pedal effort of the brake pedal being in a lowered state, determine a negative compensation amount for compensating for the target pressure, and add the determined negative compensation amount to the target pressure to compensate for the target pressure.

The controller may be configured to determine the negative compensation amount based on a pressure error that is a difference between a reference pressure of the pedal simulator and the detected pressure.

The controller may be configured to determine the reference pressure of the pedal simulator according to the detected displacement of the brake pedal.

The controller may be configured to increase the negative compensation amount as the pressure error increases, and decrease the negative compensation amount as the pressure error decreases.

The controller may be configured to deactivate the compensation for the target pressure during sudden braking.

According to an aspect of the disclosure, there is provided an electronic brake system including: a pedal simulator configured to provide a reaction force corresponding to a pedal effort of a brake pedal; a pedal displacement sensor configured to detect displacement information of the brake pedal; a pressure sensor configured to detect pressure information of the pedal simulator; and a controller configured to compensate for a target pressure according to a displacement of the brake pedal based on the displacement information of the brake pedal detected through the pedal displacement sensor and the pressure information of the pedal simulator detected through the pressure sensor, and generate a braking force according to the compensated target pressure.

The controller may be configured to: determine the target pressure based on the detected displacement information of the brake pedal; determine whether the pedal effort of the brake pedal is in a lowered state, based on the detected displacement information of the brake pedal and the detected pressure information of the pedal simulator; in response to the pedal effort of the brake pedal being in a lowered state, determine a negative compensation amount for compensating for the determined target pressure; apply the determined negative compensation amount to the determined target pressure to compensate for the target pressure; and generate the braking force according to the compensated target pressure.

According to an aspect of the disclosure, there is provided a method of controlling an electronic brake system including a reservoir in which a pressurizing medium is stored, a master cylinder configured to discharge the pressurizing medium according to a pedal effort of a brake pedal, a hydraulic pressure supply device configured to operate a hydraulic piston according to an electrical signal output in response to a displacement of the brake pedal to generate a hydraulic pressure, a hydraulic control unit connected to the hydraulic pressure supply device and configured to control a flow of the hydraulic pressure transferred to a wheel cylinder, a pedal simulator connected to the master cylinder and configured to provide a reaction force for the brake pedal, a simulator valve configured to open and close a flow path connecting the master cylinder and the pedal simulator, and a cut valve configured to open and close a flow path connecting the master cylinder and the hydraulic control unit, the method including: detecting displacement information of the brake pedal; detecting pressure information of the pedal simulator; determining a target pressure according to the detected displacement information of the brake pedal; compensating for the determined target pressure based on the detected displacement information of the brake pedal and the detected pressure information of the pedal simulator when the cut valve is closed and the simulator valve is opened; and generating a braking force according to the compensated target pressure.

The compensating for the target pressure may include: identifying a state of the pedal effort of the brake pedal based on the detected displacement information of the brake pedal and the detected pressure information of the pedal simulator; and in response to the pedal effort being in a lowered state, compensating for the target pressure.

The compensating for the target pressure may include: in response to the pedal effort of the brake pedal being in a lowered state, determining a negative compensation amount for compensating for the target pressure; and adding the determined negative compensation amount to the target pressure to compensate for the target pressure.

The determining of the negative compensation amount may include determining the negative compensation amount based a pressure error that is a difference between a reference pressure of the pedal simulator according to the detected displacement of the brake pedal and the detected pressure of the pedal simulator.

The determining of the negative compensation amount may include increasing the negative compensation amount as the pressure error increases, and decreasing the negative compensation amount as the pressure error decreases.

Advantageous Effects

As is apparent from the above, the electronic brake system and the method of controlling the same can realize a uniform braking deceleration even when the pedal effort characteristics of a brake pedal are changed.

MODES OF THE DISCLOSURE

Like numerals refer to like elements throughout the specification. Not all elements of embodiments of the present disclosure will be described, and description of what are commonly known in the art or what overlap each other in the embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements, In the specification, it will be understood that, when a member is referred to as being "on/under" another member, it can be directly on/under the other member, or one or more intervening members may also be present.

Although the terms "first," "second," "A," "B," etc. may be used to describe various components, the terms do not limit the corresponding components, but are used only for the purpose of distinguishing one component from another component. As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Figure 1:
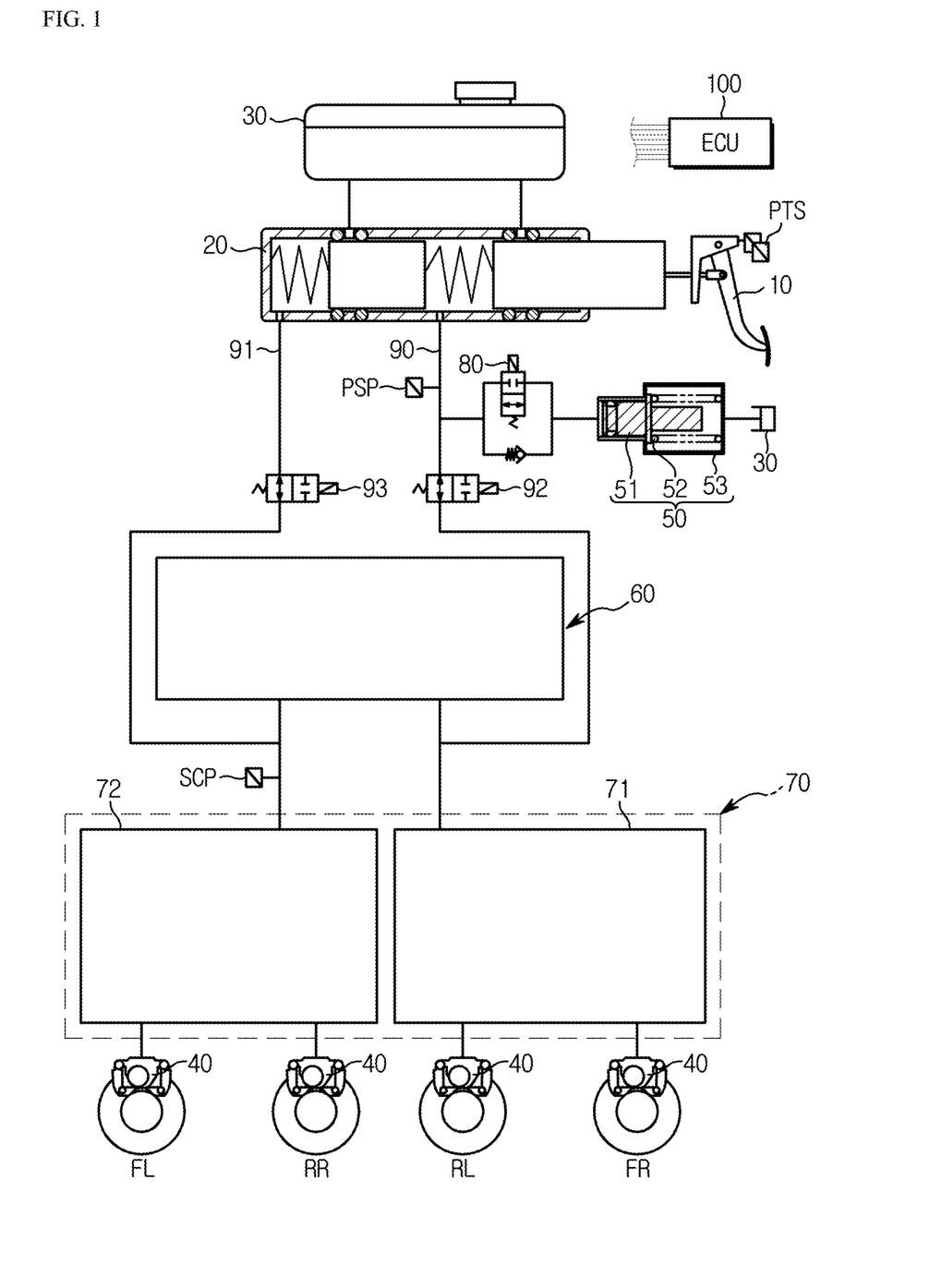
FIG. 1 illustrates a hydraulic circuit diagram of an electronic brake system according to an embodiment.

FIG. 1 illustrates a hydraulic circuit diagram of an electronic brake system according to an embodiment.

Referring to FIG. 1, the electronic brake system may include a master cylinder 20 configured to pressurize and discharge a pressurizing medium accommodated therein by a manipulation of a brake pedal 10, a reservoir 30 coupled to an upper side of the master cylinder 20 to store the pressurized medium, wheel cylinders 40 provided on respective wheels RR, RL, FR, and FL, a pedal simulator 50 configured to provide a reaction force according to a pedal effort of the brake pedal 10, a liquid pressure supply device 60 provided to be driven by an electrical signal corresponding to a displacement of the brake pedal 10 to generate an hydraulic pressure and supply the generated hydraulic pressure to each wheel cylinder 40 provided in a corresponding one of the wheel RR, RL, FR, and FL, a hydraulic control unit 70 configured to control the flow of hydraulic pressure transferred from the liquid pressure supply device 60 to each wheel cylinder 40, and a controller (an electronic control unit ECU) 100 configured to control the liquid pressure supply device 60, the hydraulic control unit 70, and various valves based on hydraulic pressure information and pedal displacement information.

The pedal simulator 50 may include a simulation chamber 51 provided to store a pressurizing medium flowing out of the master cylinder 20, a reaction force piston 52 provided in the simulation chamber 51, and a reaction force spring 53 elastically supporting the simulation chamber 51. The pedal simulator 50 may provide the driver with an appropriate pedal feel by forming a pressure in the simulation chamber 51.

A simulator valve 80 may be provided in a flow path between the master cylinder 20 and the pedal simulator 50. The simulator valve 80 may open and close the flow path between the master cylinder 20 and the pedal simulator 50. When the simulator valve 80 is opened, a hydraulic pressure generated by the master cylinder 20 may be transferred to the pedal simulator 50. The simulator valve 80 may be provided as a normally-closed type solenoid valve that is normally closed and operates to open based on an open-signal being received from the controller 100.

The liquid pressure supply device 60 may be provided as a device of various methods and structures. For example, driven by a driving force of a motor based on an electrical signal output in response to a displacement of the brake pedal 10, a hydraulic piston pushes the pressurizing medium in the chamber to transfer a hydraulic pressure to the hydraulic control unit 50. In addition, the liquid pressure supply device 40 may be provided as a motor-driven pump or a high-pressure accumulator. Specifically, when a driver applies a pedal effort to the brake pedal 10, the brake pedal 10 changes in displacement, which causes a pedal displacement sensor (a pedal travel sensor: PTS) to transmit an electrical signal, based on which the motor may be operated. Between the motor and the hydraulic piston, a power converter for converting the rotational motion of the motor into a linear motion may be provided. The power converter may include a worm and a worm gear and/or a rack and pinion gear.

The hydraulic control unit 70 may include a first hydraulic circuit 71 for receiving a hydraulic pressure and controlling the hydraulic pressure transferred to two-wheel cylinders and a second hydraulic circuit 72 for receiving a hydraulic pressure and controlling the hydraulic pressure transferred to the other two wheel cylinders. For example, the first hydraulic circuit 51 may control a right front wheel FR and a left rear wheel RL, and the second hydraulic circuit 52 may control a left front wheel FL and a right rear wheel RR. The disclosure is not limited thereto, and the positions of the wheels connected to the first hydraulic circuit 51 and the second hydraulic circuit 52 may be variously configured.

The hydraulic control unit 70 may include an inlet valve provided at the front end of each wheel cylinder 40 to control a hydraulic pressure, and an outlet valve branched between the inlet valve and the wheel cylinder 40 and connected to the reservoir 30. The liquid pressure supply device 60 may be connected to the front end of the inlet valve of the first hydraulic circuit 71, and the liquid pressure supply device 60 may be connected to the front end of the inlet valve of the second hydraulic circuit 72. Hydraulic pressure generated and supplied by the liquid pressure supply device 40 may be supplied to each of the first hydraulic circuit 71 and the second hydraulic circuit 72.

Backup flow paths 90 and 91 are flow paths that are used in a fall back mode, in which the electronic brake system is not operable normally due to a failure of the hydraulic pressure supply device 60, and the like, to directly supply the hydraulic pressure discharged from the master cylinder 20 to the hydraulic control unit 70 such that braking is implemented.

The backup flow paths 90 and 91 may include a first backup flow path 90 for connecting a first cylinder chamber of the master cylinder 20 to the first hydraulic circuit 71 and a second backup flow path 91 for connecting a second cylinder chamber of the master cylinder 20 to the second hydraulic circuit 72.

A first cut valve 92 for controlling the flow of hydraulic pressure may be installed in the first backup flow path 90.

A second cut valve 93 for controlling the flow of hydraulic pressure may be installed in the second backup flow path 91.

The first cut valve 92 and the second cut valve 93 may be provided as normally-open solenoid valves that are normally open and operate to be closed in response to receiving a closing signal from the controller. In order to simplify the structure of the apparatus by reducing the number of valves, at least one of the first backup flow path 90 and the second backup flow path 91 may not be provided with a cut valve. Instead, in order for the outlet valve provided in the first hydraulic circuit 71 to perform the function of the cut valve, the first backup flow path 90 may be connected to the outlet valve of the first hydraulic circuit 71, or in order for the outlet valve provided in the second hydraulic circuit 72 to perform the function of the cut valve, the second backup flow path 91 may be connected to the outlet valve of the second hydraulic circuit 72.

Reference symbol PSP may denote a pedal simulator pressure sensor for detecting the pressure of the pedal simulator 50, and reference symbol SCP may denote a circuit pressure sensor for detecting the hydraulic pressure of the hydraulic circuit.

Figure 2:
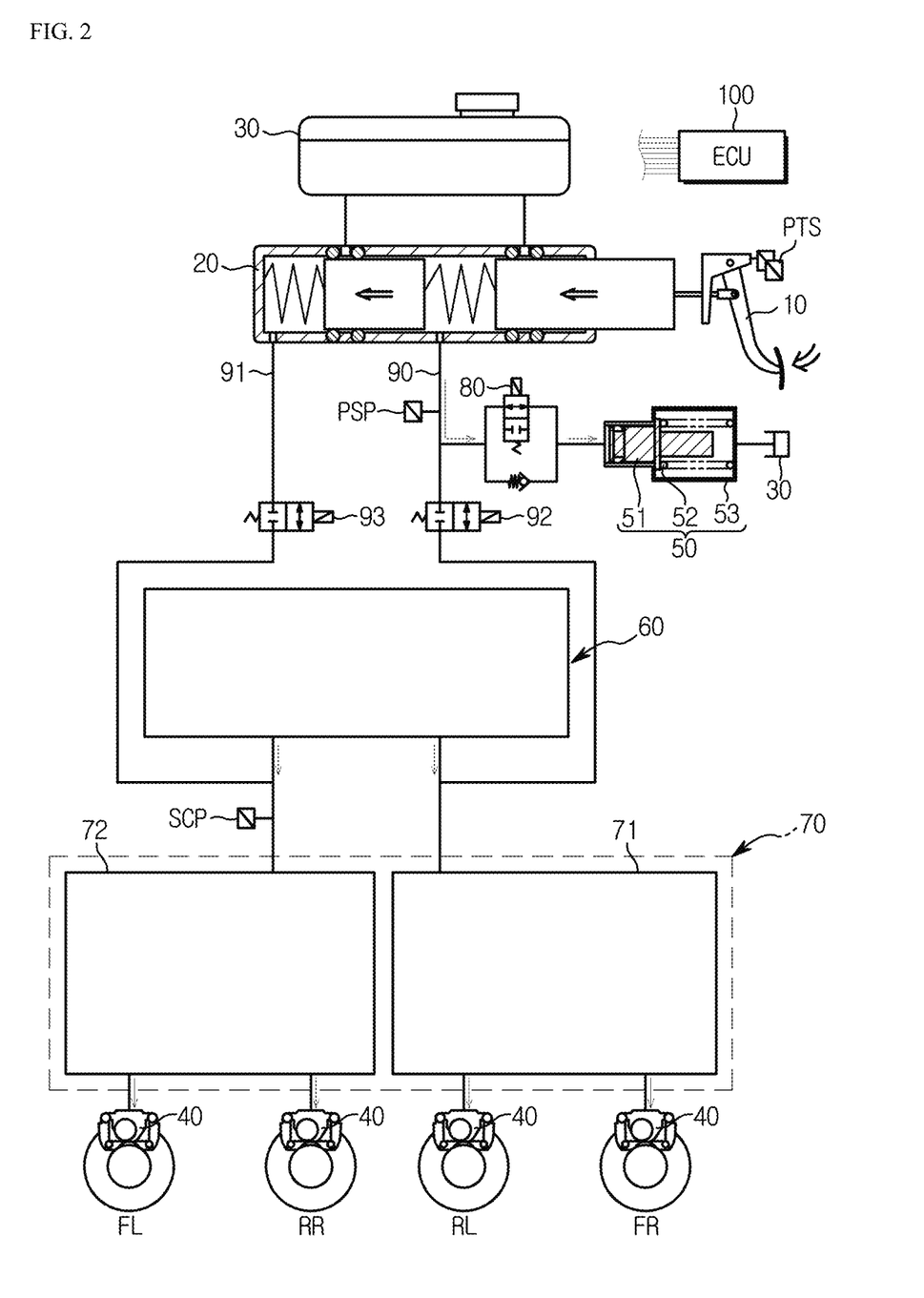
FIG. 2 illustrates a normal operation mode of an electronic brake system according to an embodiment.

FIG. 2 illustrates a normal operation mode of an electronic brake system according to an embodiment.

Referring to FIG. 2, the controller 100 may, in response to the driver manipulating the brake pedal 20, close the first cut valve 92 and the second cut valve 93 and open the simulator valve 80.

The controller 100 may operate the hydraulic pressure supply device 60 based on a brake pedal displacement detected through the pedal displacement sensor PTS. The hydraulic pressure generated by the hydraulic pressure supply device 60 may be transferred to the first hydraulic circuit 71 and the second hydraulic circuit 72, and then supplied to each wheel cylinder 40, in which a braking force is generated.

As the operation of the brake pedal 10 proceeds, a hydraulic pressure may be generated in the master cylinder 20, and the generated hydraulic pressure may be transferred to the pedal simulator 50 through the simulator valve 80. The hydraulic pressure transferred to the pedal simulator 50 may provide the driver with a pedal feel.

Figure 3:
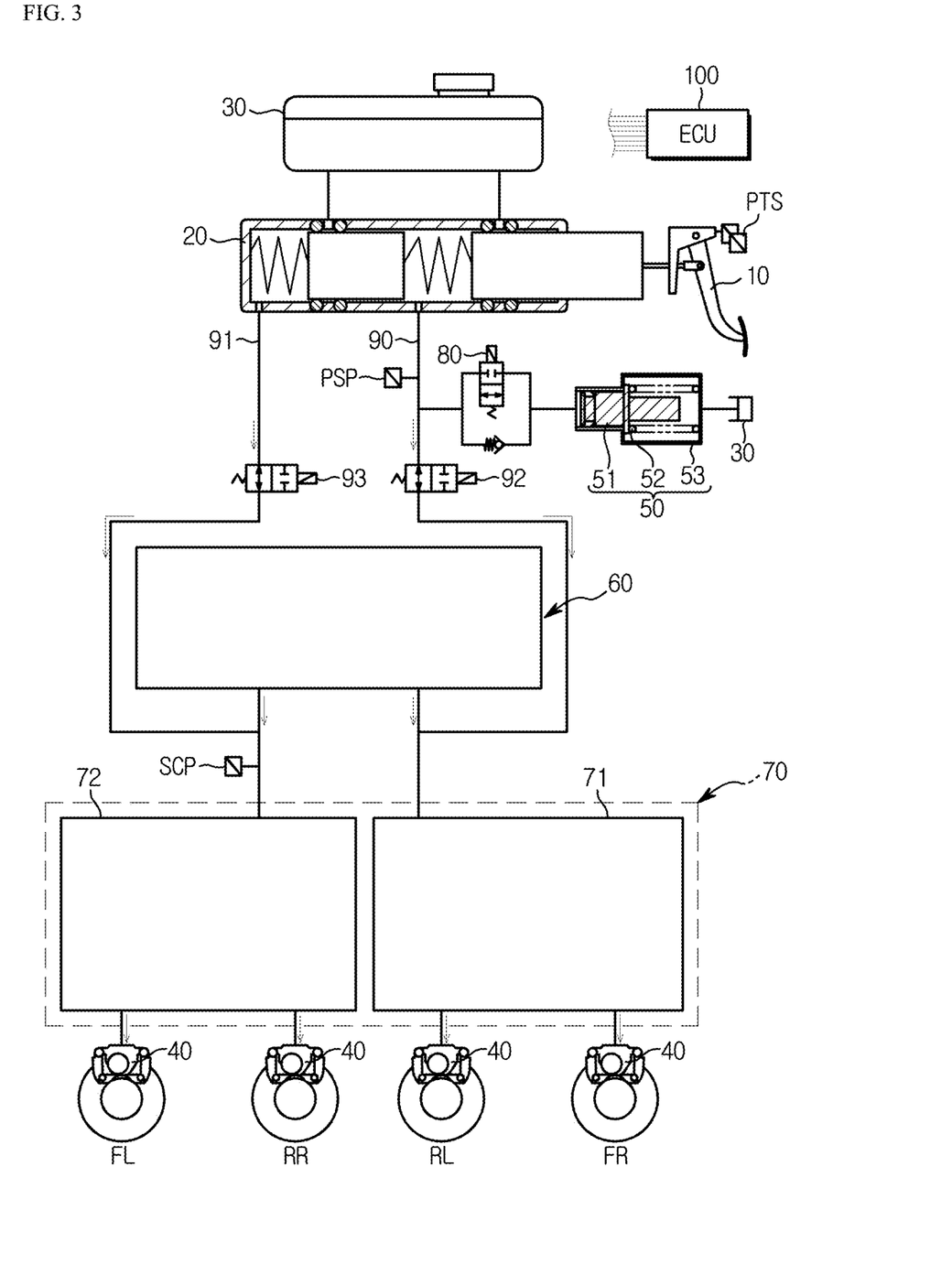
FIG. 3 illustrates an abnormal operation mode (a fallback mode) of an electronic brake system according to an embodiment.

FIG. 3 illustrates an abnormal operation mode (a fallback mode) of an electronic brake system according to an embodiment.

Referring to FIG. 3, when the electronic brake system does not operate normally, each valve may be controlled in an initial state, which is a non-operating state. When the driver applies the brake pedal 10, the hydraulic pressure generated by the master cylinder 20 may be directly supplied to the hydraulic circuits 71 and 72 and each wheel cylinder 40 through the backup flow paths 90 and 91.

Figure 4:
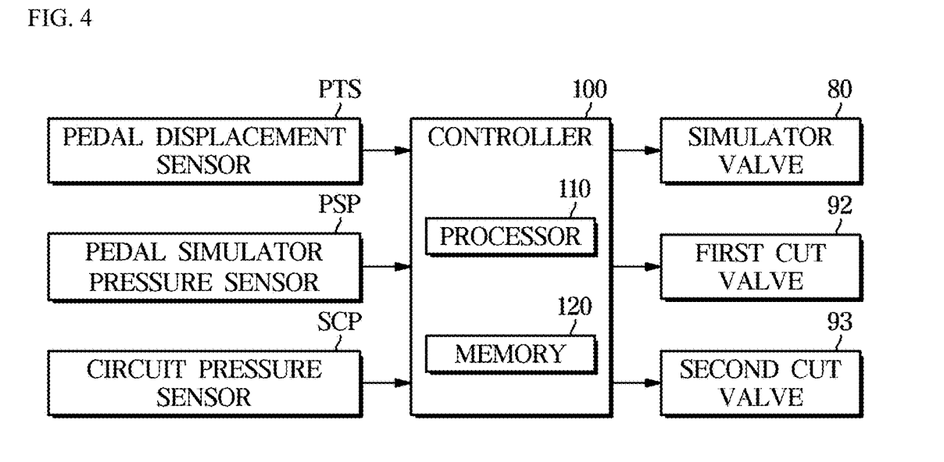
FIG. 4 illustrates a control block diagram of an electronic brake system according to an embodiment.

FIG. 4 illustrates a control block diagram of an electronic brake system according to an embodiment.

Referring to FIG. 4, the controller 100 performing overall control of the electronic brake system has an input side electrically connected to the pedal displacement sensor PTS, the pedal simulator pressure sensor PSP, and the circuit pressure sensor SCP.

The controller 100 has an output side electrically connected to the simulator valve 80, the first cut valve 92, and the second cut valve 93.

The pedal displacement sensor PTS may detect operation information and displacement information of the brake pedal 10.

The pedal simulator pressure sensor PSP may detect the pressure of the pedal simulator 50.

The circuit pressure sensor SCP may detect the pressure of the second hydraulic circuit 72. The circuit pressure sensor SCP may detect the pressure of the first hydraulic circuit 71. The circuit pressure sensor SCP may detect the pressure of at least one of the first hydraulic circuit 71 and the second hydraulic circuit 72.

The controller 100 may be referred to as an electronic control unit (ECU).

The controller 100 may include a processor 110 and a memory 120.

The memory 120 may store a program used for processing or controlling of the processor 110 and various types of data for operating the electronic brake system.

The memory 120 may include not only volatile memories, such as an S-RAM and a D-RAM, but also non-volatile memories, such as a flash memory, a read only memory (ROM), an erasable programmable read only memory (EPROM), etc.

The processor 110 may control the overall operation of the electronic brake system.

The processor 110 may output a valve command signal to each of the simulator valve 80, the first cut valve 92, and the second cut valve 93 to open and close each valve.

The processor 110 may receive brake pedal displacement information through the pedal displacement sensor PTS. The processor 110 may recognize a brake pedal displacement value and a brake pedal displacement change rate from the received brake pedal displacement information.

The processor 110 may determine a target pressure required by the driver according to the recognized brake pedal displacement value. The processor 110 may determine a target pressure value corresponding to a brake pedal displacement value using a brake pedal displacement-target pressure map.

The processor 110 may receive pressure information of the first hydraulic circuit 71 or the second hydraulic circuit 72 through the circuit pressure sensor SCP. The processor 110 may recognize pressure values of the hydraulic circuits 71 and 72 from the received pressure information of the hydraulic circuits 71 and 72.

The processor 110 may control the liquid pressure supply device 60 and the hydraulic control unit 70 such that the pressures of the hydraulic circuits 71 and 72 reach the target pressure.

The processor 110 may compensate for the target pressure based on the brake pedal displacement information and the pedal simulator pressure information, thereby realizing a uniform braking deceleration even with a change in the characteristics of the pedal effort of the brake pedal.

As described above, the electronic brake system operates to, when the driver operates the brake pedal 20 in a normal operation mode, close the first cut valve 92 and the second cut valve 93 to block the flow path between the master cylinder 20 and the hydraulic control unit 70 and open the simulator valve 80 such that the hydraulic pressure generated by the master cylinder 20 is transferred to the pedal simulator 50.

However, if the cut valve has a delay of closing due to the characteristics thereof, or the driver's pedal input acceleration is great, the initial hydraulic pressure generated by the master cylinder is not transferred from the pedal simulator but leaking to the side of the hydraulic control unit 70 before the first cut valve 92 is closed, so that the pedal effort of the brake pedal may be momentarily lightened.

In the electronic brake system, the target pressure is determined according to the brake pedal displacement, and if the brake pedal effort is lightened, the brake pedal displacement amount is increased as much as the reduced brake pedal effort, so that the target pressure may be determined to be high relative to the brake pedal effort intended by the driver. As a result, the vehicle may be controlled at a target pressure higher than that of a normal state, and abruptly decelerate, which causes the driver to feel a deceleration abruptness.

Figure 5:
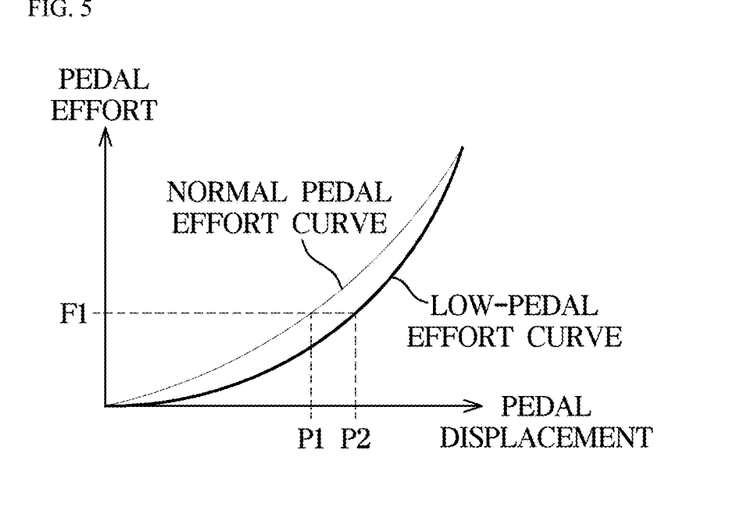
FIG. 5 illustrates a graph representing a correlation between a brake pedal effort and a brake pedal displacement in an electronic brake system according to an embodiment.

FIG. 5 illustrates a graph representing a correlation between a brake pedal effort and a brake pedal displacement in an electronic brake system according to an embodiment.

Referring to FIG. 5, the horizontal axis represents the brake pedal displacement, and the vertical axis represents the brake pedal effort.

In a normal pedal effort curve, when the brake pedal effort value is F1, the brake pedal displacement value is P1.

It can be seen that, in a low pedal effort curve, when the brake pedal effort value is F1, the brake pedal displacement value is P2 greater than P1.

In response to the brake pedal effort being lowered, the driver needs to apply the brake pedal 10 deeper than when the brake pedal effort is normal, in order to feel the same brake pedal effort.

Since the target pressure desired by the driver is determined by the brake pedal displacement, the lowered brake pedal effort causes the target pressure to increase regardless of the intention of the driver. As such, when the brake pedal effort is lowered, control is performed at a target pressure higher than that in the normal pedal effort state, the vehicle may abruptly decrease, which may cause the driver to feel a deceleration abruptness.

Referring again to FIG. 4, the processor 110 may determine whether a decrease in brake pedal effort has occurred based on the brake pedal displacement information and the pedal simulator pressure information, and if a decrease in brake pedal effort has occurred, compensate for the target pressure.

The processor 110 may limit the target pressure when a decrease in brake pedal effort has occurred.

The processor 110 may compensate for the target pressure according to the brake pedal displacement when a decrease in brake pedal effort has occurred.

The processor 110 may limit the target pressure according to the brake pedal displacement when a decrease in brake pedal effort has occurred.

The processor 110 may determine whether a decrease in brake pedal effort has occurred based on a brake pedal displacement value and a pedal simulator pressure value.

The processor 110 may determine that a decrease in brake pedal effort has occurred if the brake pedal displacement value is higher than a preset displacement value and the pedal simulator pressure value is lower than a preset pressure.

The processor 110 may determine whether a decrease in brake pedal effort has occurred based on a brake pedal displacement value, a pedal simulator pressure value, a brake pedal displacement change rate, and a pedal simulator pressure change rate.

The processor 110 may determine that a decrease in brake pedal effort has occurred if the brake pedal displacement value is higher than a preset displacement value, the pedal simulator pressure value is lower than a preset pressure value, the brake pedal displacement change rate is higher than a preset displacement change rate, and the pedal simulator pressure change rate is lower than a preset pressure change rate.

Figure 6:
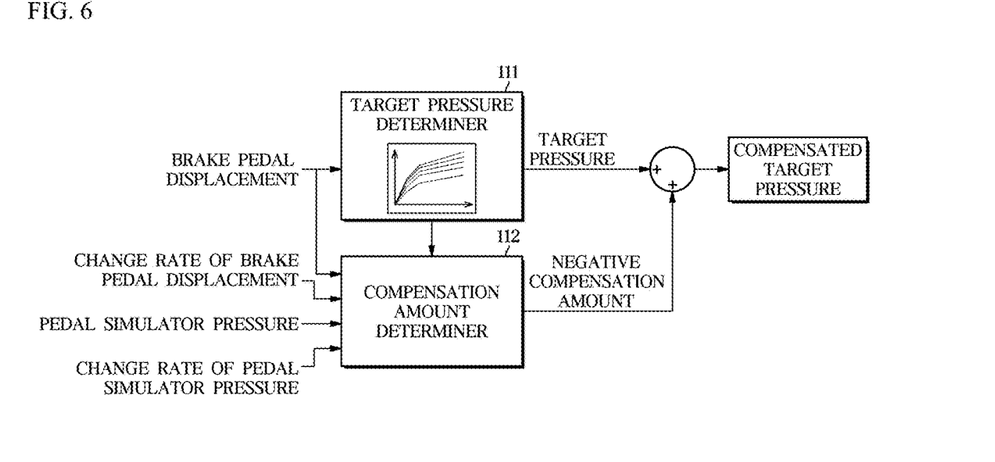
FIG. 6 illustrates a concept of compensating for a target pressure in an electronic brake system according to an embodiment.

FIG. 6 illustrates a concept of compensating for a target pressure in an electronic brake system according to an embodiment.

Referring to FIG. 6, the processor 110 may include a target pressure determiner 111 and a compensation amount determiner 112.

The target pressure determiner 111 may determine a target pressure value corresponding to an input brake pedal displacement value according to the brake pedal displacement-target pressure map.

The compensation amount determiner 112 may determine whether a decrease in brake pedal effort has occurred based on brake pedal displacement information and pedal simulator pressure information, and in response to determining that a decrease in brake pedal effort has occurred, may determine a target pressure compensation amount for compensating for the target pressure determined by the target pressure determiner 111.

The compensation amount determiner 112 may determine whether a decrease in brake pedal effort has occurred based on the brake pedal displacement value, the pedal simulator pressure value, the brake pedal displacement change rate, and the pedal simulator pressure change rate.

The compensation amount determiner 112 may determine the target pressure compensation amount as a negative compensation amount.

The compensation amount determiner 112 may limit the target pressure compensation amount to be less than a preset level in relation to the target pressure. For example, the target pressure compensation amount may be less than or equal to 10% of the target pressure.

The compensation amount determiner 112 may determine the negative compensation amount based on a pedal simulator pressure error.

The compensation amount determiner 112 may determine the negative compensation amount to be greater as the pedal simulator pressure error increases, and may determine the negative compensation amount to be smaller as the pedal simulator pressure error decreases.

The compensation amount determiner 112 may determine the negative compensation amount to be greater as the pedal simulator pressure error is higher than a preset error, and may determine the negative compensation amount to be smaller as the pedal simulator pressure error is lower than the preset error.

The pedal simulator pressure error may be a pressure difference between a pedal simulator reference pressure value and a pedal simulator pressure value detected through the pedal simulator pressure sensor PSP. The pedal simulator reference pressure value may be determined according to the brake pedal displacement.

The target pressure determined by the target pressure determiner 111 and the negative compensation amount determined by the compensation amount determiner 112 may be summed to limit the target pressure such that the target pressure may be compensated for.

The processor 110 having the above configuration may apply the compensation amount only one time in one braking cycle. This is to prevent the compensation amount from being accumulated and output as a value that is not desired by the driver.

The processor 110 may deactivate or prohibit target pressure compensation when the vehicle is suddenly braked. This is to prevent the pressure generation performance from being degraded due to compensating for the target pressure during sudden braking.

Figure 7:
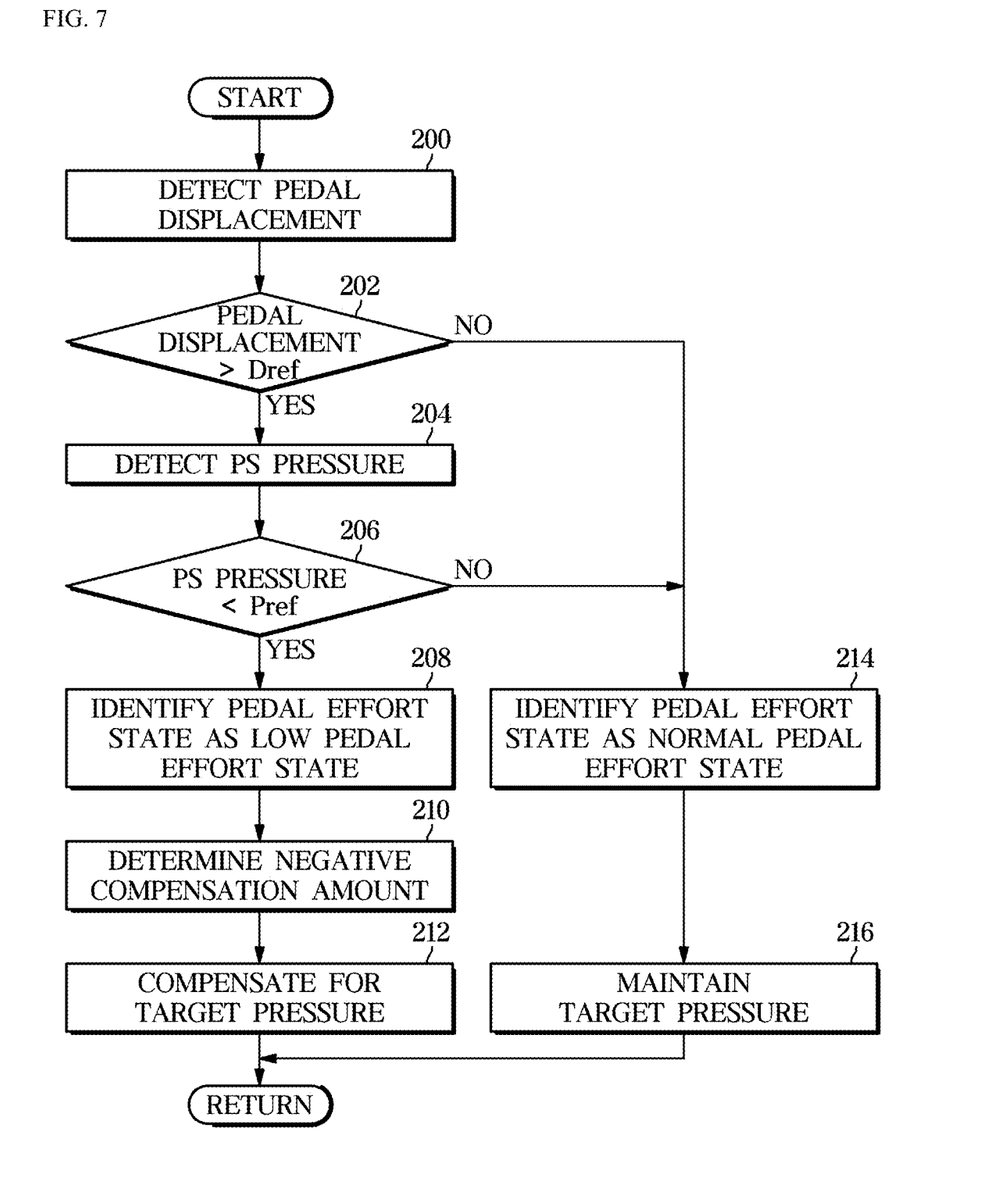
FIG. 7 illustrates a method of controlling an electronic brake system according to an embodiment.

FIG. 7 illustrates a method of controlling an electronic brake system according to an embodiment.

Referring to FIG. 7, the processor 110 may detect the displacement of the brake pedal through the pedal displacement sensor PTS (200).

The processor 110 may compare the detected brake pedal displacement with a preset displacement Dref to identify whether the detected brake pedal displacement is greater than the preset displacement Dref (202).

If a result of the identification in operation mode 202 is that the detected brake pedal displacement is greater than the preset displacement Dref, the processor 110 may detect a pressure (a PS pressure) of the pedal simulator 50 through the pedal simulator pressure sensor PSP (204).

The processor 110 may compare the pedal simulator pressure with a preset pressure Pref to identify whether the detected pedal simulator pressure is less than the preset pressure Pref (206).

If a result of the identification in operation mode 206 is that the pedal simulator pressure is less than the preset pressure Pref, the processor 110 may identify that the brake pedal effort is in a low pedal effort state (208), and determine a negative compensation amount for compensating for the target pressure according to the brake pedal displacement (210).

Figure 8:
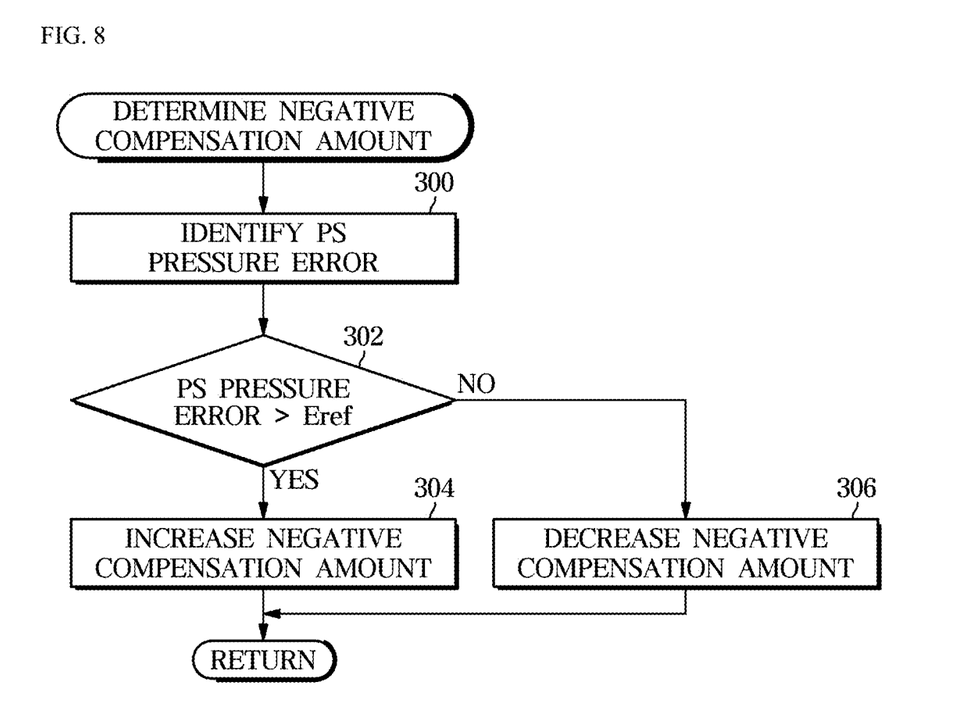
FIG. 8 illustrates determining the amount of negative compensation in an electronic brake system according to an embodiment.

FIG. 8 illustrates determining the amount of negative compensation in an electronic brake system according to an embodiment.

Referring to FIG. 8, the processor 110 may identify a pressure error of the pedal simulator 50 (300). The pedal simulator pressure error may be a pressure difference between a pedal simulator reference pressure value of the pedal simulator 50 and a pedal simulator pressure value detected through the pedal simulator pressure sensor PSP. The pedal simulator reference pressure value may be determined according to the brake pedal displacement.

The processor 110 may compare the identified pedal simulator pressure error with a preset error Eref to identify whether the identified pedal simulator pressure error is greater than the preset error Eref (302).

If a result of the identification in operation mode 302 is that the identified d pedal simulator pressure error is greater than the preset error Eref, the processor 110 may increase the negative compensation amount (304).

On the other hand, if a result of the identification in operation mode 302 is that the identified pedal simulator pressure error is not greater than the preset error Eref, the processor 110 may decrease the negative compensation amount (306).

That is, the negative compensation amount may be determined to be greater as the pedal simulator pressure error increases, and may be determined to be smaller as the pedal simulator pressure error decreases. The negative compensation amount may be limited to be less than a preset level in relation to the target pressure. For example, the negative compensation amount may be less than or equal to 10% of the target pressure.

Referring again to FIG. 7, the processor 110, after determining the negative compensation amount, may add the determined negative compensation amount to the target pressure according to the brake pedal displacement to compensate for the target pressure (212).

On the other hand, if a result of the identification in operation mode 202 is that the detected brake pedal displacement is not greater than the preset displacement Dref or a result of the identification in operation mode 206 is that the detected pedal simulator pressure is not less than the preset pressure Pref, the processor 110 may identify that the brake pedal effort is in a normal pedal effort state (214), and maintain the current target pressure without compensating for the target pressure according to the brake pedal displacement (216).

As described above, in the electronic brake system according to the embodiment, even if the pedal effort characteristics of the brake pedal are degraded, the target pressure may be limited according to the change in the brake pedal effort, thereby realizing a uniform braking deceleration.

As is apparent from the above, the electronic brake system and the method of controlling the same can realize a uniform braking deceleration even when the pedal effort characteristic of a brake pedal are changed.

The invention claimed is:

1. An electronic brake system comprising:
a reservoir in which a pressurizing medium is stored;
a master cylinder configured to discharge the pressurizing medium according to a pedal effort of a brake pedal;
a hydraulic pressure supply device configured to operate a hydraulic piston according to an electrical signal output in response to a displacement of the brake pedal to generate a hydraulic pressure;
a hydraulic control unit connected to the hydraulic pressure supply device and configured to control a flow of the hydraulic pressure transferred to a wheel cylinder;
a pedal simulator connected to the master cylinder and configured to provide a reaction force for the brake pedal;
a simulator valve configured to open and close a flow path connecting the master cylinder and the pedal simulator;
a cut valve configured to open and close a flow path connecting the master cylinder and the hydraulic control unit;
a pedal displacement sensor configured to detect displacement information of the brake pedal;

a pressure sensor configured to detect pressure information of the pedal simulator; and
a controller configured to compensate for a target pressure according to the displacement of the brake pedal based on the displacement information of the brake pedal detected through the pedal displacement sensor and the pressure information of the pedal simulator detected through the pressure sensor when the cut valve is closed and the simulator valve is opened, and drive the hydraulic pressure supply device according to the compensated target pressure,
wherein the controller is configured to identify a state of the pedal effort of the brake pedal based on the detected displacement information of the brake pedal and the detected pressure information of the pedal simulator, and in response to the pedal effort being in a lowered state, compensate for the target pressure.

2. The electronic brake system of claim 1, wherein the controller is configured to, in response to a value of the detected displacement of the brake pedal being higher than a preset displacement value and a value of the detected pressure of the pedal simulator being lower than a preset pressure value, compensate for the target pressure.

3. The electronic brake system of claim 1, wherein the controller compensates for the target pressure based on a value of the detected displacement e of the brake pedal, a change rate of the detected displacement of the brake pedal, a value of the detected pressure of the pedal simulator, and a change rate of the detected pressure of the pedal simulator.

4. The electronic brake system of claim 3, wherein the controller is configured to,
in response to the value of the detected displacement of the brake pedal being higher than a preset displacement value,
the change rate of the detected displacement of the brake pedal being higher than a preset displacement change rate,
the value of the detected pressure of the pedal simulator being lower than a preset pressure value, and
the change rate of the detected pressure of the pedal simulator being lower than a preset pressure change rate, compensate for the target pressure.

5. The electronic brake system of claim 1, wherein the controller is configured to, in response to the pedal effort being in a lowered state, decrease the target pressure.

6. The electronic brake system of claim 5, wherein the controller is configured to,
in response to a value of the detected displacement of the brake pedal being higher than a preset displacement value,
a change rate of the detected displacement of the brake pedal being higher than a preset displacement change rate,
a value of the detected pressure of the pedal simulator being lower than a preset pressure value, and
a change rate of the detected pressure of the pedal simulator being lower than a preset pressure change rate, identify that the pedal effort of the brake pedal is in a lowered state.

7. The electronic brake system of claim 1, wherein the controller is configured to, in response to the pedal effort of the brake pedal being in a lowered state, determine a negative compensation amount for compensating for the target pressure, and add the determined negative compensation amount to the target pressure to compensate for the target pressure.

8. The electronic brake system of claim 7, wherein the controller is configured to determine the negative compensation amount based on a pressure error that is a difference between a reference pressure of the pedal simulator and the detected pressure.

9. The electronic brake system of claim 8, wherein the controller is configured to determine the reference pressure of the pedal simulator according to the detected displacement of the brake pedal.

10. The electronic brake system of claim 8, wherein the controller is configured to increase the negative compensation amount as the pressure error increases, and decrease the negative compensation amount as the pressure error decreases.

11. The electronic brake system of claim 1, wherein the controller is configured to deactivate the compensation for the target pressure during sudden braking.

12. An electronic brake system comprising:
a pedal simulator configured to provide a reaction force corresponding to a pedal effort of a brake pedal;
a pedal displacement sensor configured to detect displacement information of the brake pedal;
a pressure sensor configured to detect pressure information of the pedal simulator; and
a controller configured to compensate for a target pressure according to a displacement of the brake pedal based on the displacement information of the brake pedal detected through the pedal displacement sensor and the pressure information of the pedal simulator detected through the pressure sensor, and generate a braking force according to the compensated target pressure,
wherein the controller is configured to identify a state of the pedal effort of the brake pedal based on the detected displacement information of the brake pedal and the detected pressure information of the pedal simulator, and in response to the pedal effort being in a lowered state, compensate for the target pressure.

13. The electronic brake system of claim 12, wherein the controller is configured to:
determine the target pressure based on the detected displacement information of the brake pedal;
determine whether the pedal effort of the brake pedal is in the lowered state based on the detected displacement information of the brake pedal and the detected pressure information of the pedal simulator;
in response to the pedal effort of the brake pedal being in the lowered state, determine a negative compensation amount for compensating for the determined target pressure; and
apply the determined negative compensation amount to the determined target pressure to compensate for the target pressure.

14. A method of controlling an electronic brake system including a reservoir in which a pressurizing medium is stored, a master cylinder configured to discharge the pressurizing medium according to a pedal effort of a brake pedal, a hydraulic pressure supply device configured to operate a hydraulic piston according to an electrical signal output in response to a displacement of the brake pedal to generate a hydraulic pressure, a hydraulic control unit connected to the hydraulic pressure supply device and configured to control a flow of the hydraulic pressure transferred to a wheel cylinder, a pedal simulator connected to the master cylinder and configured to provide a reaction force for the brake pedal, a simulator valve configured to open and close a flow path connecting the master cylinder and the pedal simulator, and a cut valve configured to open and close a flow path connecting the master cylinder and the hydraulic control unit, the method comprising:

detecting displacement information of the brake pedal;

detecting pressure information of the pedal simulator;

determining a target pressure according to the detected displacement information of the brake pedal;

compensating for the determined target pressure based on the detected displacement information of the brake pedal and the detected pressure information of the pedal simulator when the cut valve is closed and the simulator valve is opened; and     generating a braking force according to the compensated target pressure, and     wherein the compensating for the target pressure includes:

identifying a state of the pedal effort of the brake pedal based on the detected displacement information of the brake pedal and the detected pressure information of the pedal simulator; and     in response to the pedal effort being in a lowered state, compensating for the target pressure.

15. The method of claim 5, wherein the compensating for the target pressure includes:

in response to the pedal effort of the brake pedal being in a lowered state, determining a negative compensation amount for compensating for the target pressure; and     adding the determined negative compensation amount to the target pressure to compensate for the target pressure.

16. The method of claim 15, wherein the determining of the negative compensation amount includes     determining the negative compensation amount based a pressure error that is a difference between a reference pressure of the pedal simulator according to the detected displacement of the brake pedal and the detected pressure of the pedal simulator.

17. The method of claim 16, wherein the determining of the negative compensation amount includes increasing the negative compensation amount as the pressure error increases, and decreasing the negative compensation amount as the pressure error decreases.

* * * * *